United States Patent Office 2,925,738
Patented Feb. 23, 1960

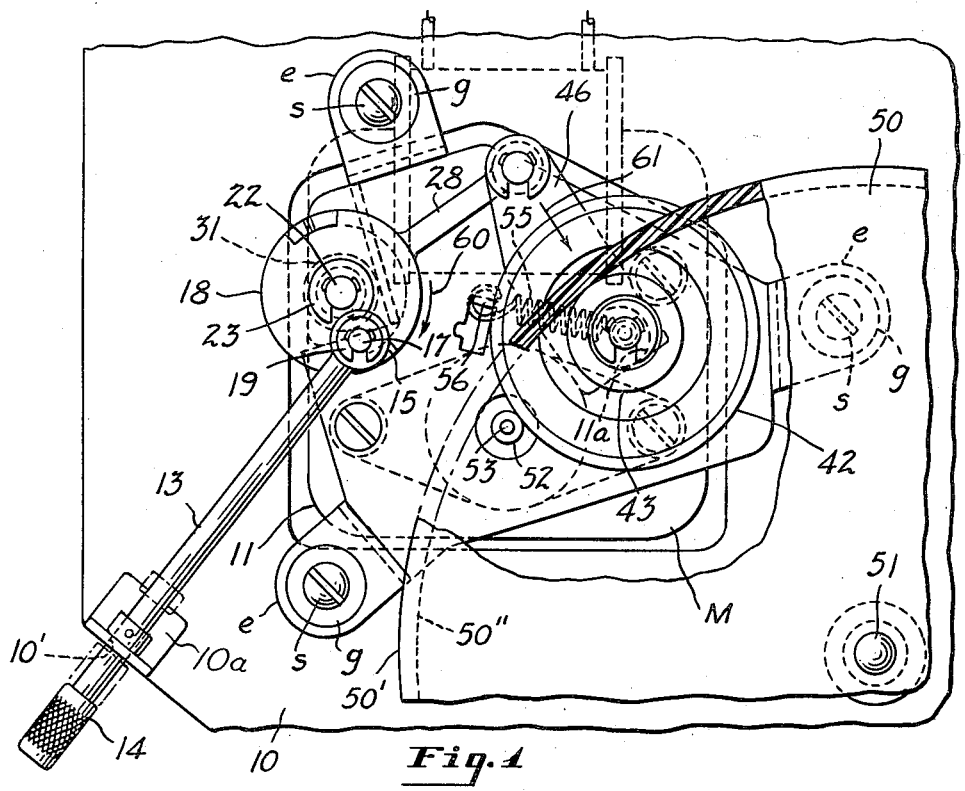
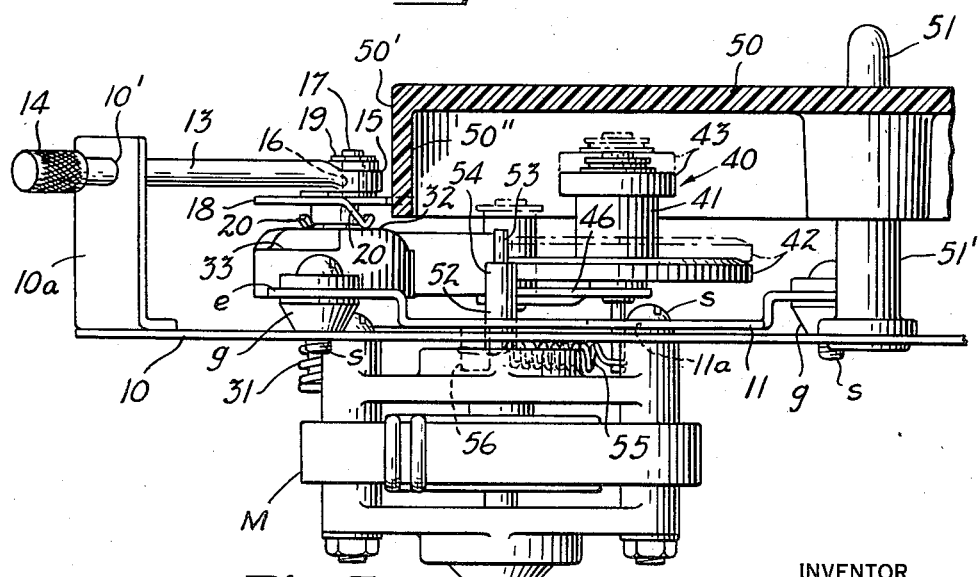

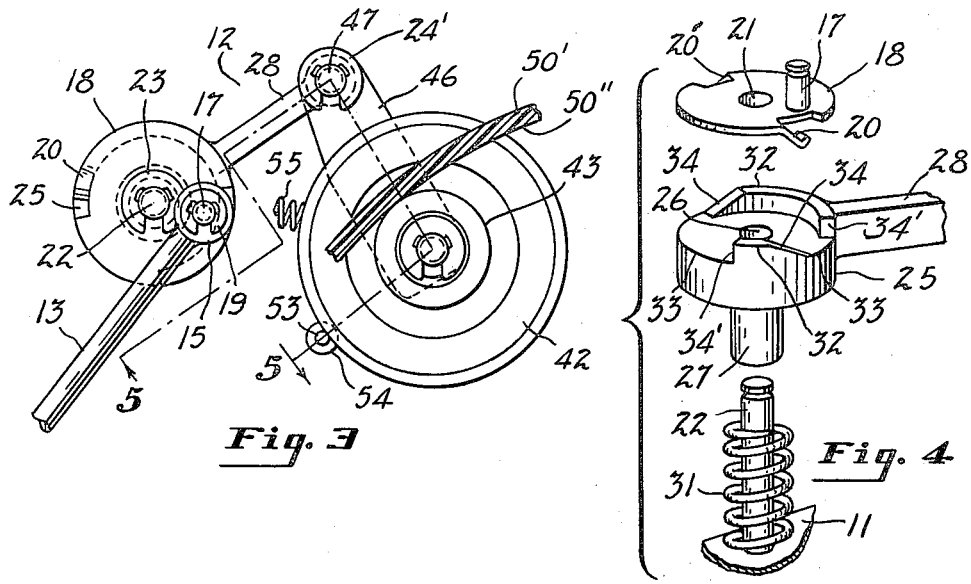
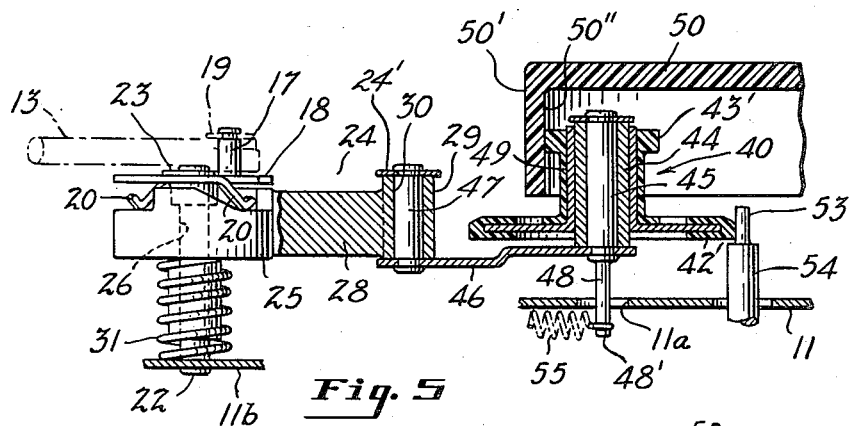
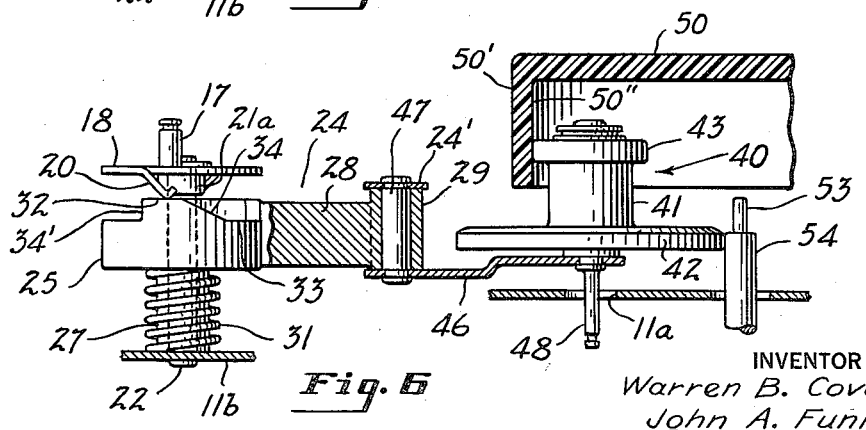
INVENTOR
Warren B. Coven
John A. Funk

2,925,738

PLURAL SPEED PHONOGRAPH TURNTABLE DRIVE MECHANISMS

Warren B. Coven, Kipton, and John A. Funk, Elyria, Ohio, assignors to The General Industries Company, Elyria, Ohio, a corporation of Ohio Application April 7, 1958, Serial No. 726,874

6 Claims. (Cl. 74—199)

Our invention relates to plural speed phonograph turntables and relates more particularly to an improved friction type driving mechanism employing idler wheel means interposed between a motor drive rotor and the inner surface of a turntable flange and relates more specifically to means for driving said idler wheel means and thereby the turntable at different speeds.

Our invention involves an improved form of friction type phonograph turntable drive mechanism whereby an idler wheel means and motor drive rotor are adapted to be relatively vertically adjusted to drive the turntable at different speeds.

Our present invention involves an improved form of friction type phonograph turntable drive mechanism whereby a friction wheel and turntable flange driving mechanism associated therewith is adapted to be selectively vertically adjusted to drive the turntable at different speeds.

Another object of our invention is to provide improved adjustment means for vertically adjusting associated friction type phonograph driving mechanism.

Still a further object of our invention is to provide improved friction type driving mechanisms for phonograph turntables whereby speed changes may be expeditiously and efficiently accomplished.

A further object of our invention is to provide an improved driving mechanism of the type referred to which will be economical to manufacture, being composed of but few parts and efficient and highly durable in use.

Other objects of our invention and the invention itself will become apparent to those skilled in the art to which our invention appertains by reference to the accompanying drawing and appended description.

In the drawings:

Fig. 1 is a top plan view of an embodiment of our invention secured to a mounting plate exposed to view by assuming the cutting away of all other portions of a superposed turntable from a remaining mere fragment of its pendant flange portion, the latter being shown as engaged by an upper step of the idler wheel of the said embodiment, a portion of the mounting plate also being broken away;

Fig. 2 is a side elevational view of the driving mechanism of Fig. 1;

Fig. 3 is a top plan view of certain of the driving mechanism of Fig. 1 showing the same in a different operative position;

Fig. 4 is an exploded view of portions of Fig. 3;

Fig. 5 is a sectional view taken on the line 5—5 of Fig. 3;

Fig. 6 is a view, similar to that of Fig. 5, showing the parts in a different operative position.

Referring now to the drawings, in all of which like parts are designated by like reference characters, and more particularly to Fig. 1, at 10 we indicate a main supporting plate preferably constructed of sheet metal, and at 11 a supplemental plate secured thereto preferably by a plurality of screws s telescoped through resilient grommet means g mounted in a plurality of upwardly offset ears e, in a well known manner. A driving motor M is preferable pendantly supported by the supplemental plate 11 by a plurality of screws S and is provided with a stepped rotor shaft 52, as best shown in Fig. 2.

The turntable 50 is carried on a turntable spindle 51 preferably journalled in a bearing tube 51' mounted on the main plate 10 for free frictionless rotation. The turntable is preferably provided with a relatively deep pendant flange 50' having a smooth cylindrical inner surface 50'' with which an element of an idler wheel assembly 40 is preferably frictionally engaged whereby rotation of the idler wheel may drive the turntable at a speed determined by the rate of rotation of the said idler wheel.

For adjusting the idler wheel to its various adjusted positions, as later more fully set forth herein, a preferably manually operable reciprocable arm 13 is superposed on the plate 10, a portion of the said arm being projected through an opening 10' disposed in the upper end of an L-shaped support arm 10a secured to a portion of the plate 10 and disposed laterally of the turntable superposed portions of said plate. A knob 14 is preferably provided on the free end of said arm which the operator may grasp to reciprocally move the arm to various selected speed change positions, and the solid and dotted line representations in Fig. 1 illustrate the two speed positions for the two speed drive mechanism of the embodiment herein illustrated. The arm 13 is provided at its opposite end with a bearing portion 15, said bearing portion having an aperture 16 disposed therein adapted to receive a post 17 mounted upon a cam follower plate 18 and projecting upwardly therefrom. Conventional clip means 19 secure the arm to the said post. It is obvious that various other operating means other than the arm herein illustrated and described, such as rotatable knob means, switch means, etc. might be employed.

The cam follower plate or "shifter" plate 18 as it may hereinafter be termed, is generally of metal and circular in form, as best shown in Figs. 1, 3 and 4, and is provided with a plurality, preferably two, of downwardly struck generally V-shaped oppositely disposed lugs 20 preferably integral with the outer periphery of the plate 18. Said lugs constitute, in the form of our invention herein illustrated and described, a pair of cam followers adapted to ride upon cam means, later referred to herein.

The plate 18 is further provided with a centrally disposed opening 21, a downwardly projecting collar 21a surrounding the same, said collar being pivotally telescoped over a cam mounting post 22 mounted upon a downwardly stepped portion 11b of the supplemental mounting plate 11, as best illustrated in Figs. 4, 5 and 6. Conventional clip means 23 are preferably provided to retain the said plate 18 on the said post 17.

A toggle link assembly 24 is disposed below the shifter plate 18 and is adapted to be associated therewith, said assembly comprises a circular hub portion 25 centrally apertured at 26, the hub having a downwardly extending sleeve portion 27 of relatively reduced diameter telescoped over the cam mounting post 22 and being provided with a laterally extending vertically disposed substantially flat metal arm 28 terminating in a circular bearing portion 29 centrally apertured at 30. The link assembly is secured as hereinafter described to an idler wheel mounting plate 46. A compression coil spring 31 is telescoped over the sleeve 27 of the hub 25 and is seated upon the plate 11 and upon the lower surface of the hub 25 exerting upward resilient pressure on the said hub portion 25. The hub 25 is provided on its upper surface with a cam face, a pair of peripherally disposed lands consisting in a pair of oppositely disposed upper lands 32 and a pair of adjacent oppositely disposed lower lands 33, each pair of upper and lower lands being connected by an inclined camming surface 34 and a straight edge 34', the said pair of cams being cammed in the same circumferential direction.

The plate 18 is adapted to be rotatably moved by the reciprocable movement of the arm 13 and the lugs 20 carried by the plate are adapted to be selectively positioned upon either the upper or the lower lands and are cammed upwardly or downwardly over the inclined cam surfaces 34 when the operator selects the different speeds. It is to be noted that the hub and associated sleeve are loosely journalled over the post 22 and are adapted to ride downwardly or upwardly on the post 22 during the speed change under the influence of the spring 31.

It is contemplated that the cam and cam follower mechanism of our preferred embodiment as illustrated herein could be reversed without changing inventive concept and that the cam face and cam follower could be of varying constructions.

The idler wheel assembly of our invention is indicated generally at 40 and comprises a two-stepped idler wheel 41, the lower step 42 being of relatively larger diameter and the upper step 43 being of relatively smaller diameter. The idler wheel 41 is mounted by means of the sleeve bearing 44 upon an idler wheel post 45 and mounted upon an idler wheel plate or link 46 which is secured to the pivot post 47 telescoped within the bearing portion 29 of the toggle link assembly 24 and secured thereto by means of conventional clip means 24'.

The idler wheel post 45 is provided with a post extension 48 which projects downwardly through an aperture 11a in the supplemental plate 11 and is adapted to have a tensile spring 55 secured thereto as indicated at 48', said tensile spring being secured to a downwardly struck lug 56 of the mounting plate 11, biasing the idler wheel against the downwardly projecting relatively deep turntable flange 50' and against a selected step of the rotor shaft.

As shown, the motor M is provided with an upwardly projecting stepped rotor shaft 52, the upper step 53 being of relatively smaller diameter and the lower step 54 being of relatively greater diameter. The lower step 42 of the idler wheel assembly 40 is adjustably and vertically movable, by reciprocating the arm 13, as shown in Fig. 2, and by means of movement of the plate 18 and the change in positioning of the lugs 20 as they are cammed upon the cam face, to be engaged with either the uppermost step of the rotor shaft or the lowermost step thereof. The upper step 43 and the lower step 42 of the idler wheel assembly 40 are preferably provided with resilient tread surfaces 43' and 42' and in the form shown in the drawings, these tread surfaces are integrally formed to form a resilient covering 49 for the entire idler wheel including the upper step, the sleeve and the lower step.

In operation, applicants' preferred two-speed change mechanism is operated as follows: When it is desired to play the phonograph at 45 r.p.m., the knob of the arm 13 is moved into the position shown in solid lines in Figs. 1, 2 and 6, and the plate 18 is rotated to the position shown, in which position each of the lugs 20, which acts as a cam follower, is disposed upon the upper land 32 of the cam face of the hub disposed beneath the plate 18 and the coil spring 31 is compressed, and exerts upward spring pressure upon the hub 25 and the relatively larger idler wheel 42 engages the relatively larger step of the rotor shaft and the relatively smaller step 43 of the idler wheel engages the turntable flange as best shown in Fig. 6.

When it is desired to play a 16 r.p.m. record, the knob 14 is advanced to the position as shown in dotted lines in Fig. 1, the plate 18 is rotated thereby, advancing each of the lugs 20 to a position where it leaves the land 32, descends the inclined camming surface 34 and engages the lowermost land 33, as best shown in Figs. 3 and 5; and, the cam is elevated upon the post 22 wherefore the idler wheel assembly 40 pivotally mounted upon the post 47 is also elevated and the relatively larger idler wheel 42 thus brought into engagement with the relatively smaller uppermost step 53 of the rotor shaft and the relatively smaller idler wheel 43 is brought into engagement with the relatively upper inner surfaces of the turntable flange.

It is to be noted that the toggle link 28 and the articulated idler wheel support plate 46 assume relatively different positions, as shown in Fig. 3 when the plate 18 is rotated to accomplish the 16 r.p.m. speed change and when the arm is again reciprocally moved to effect the change from a 16 r.p.m. to a 45 r.p.m. position. It will also be noted that during the shifting from the 16 r.p.m. position to the 45 r.p.m. position, the plate 18 is rotated in a clockwise direction as shown by the arrow 60 in Fig. 1, and as the lugs 20 ride up the inclined camming surfaces 34, the hub portion 25 tends to rotate with said plate. This action causes the arm 28 and the bearing 29 to move slightly in the direction of the turntable 50 shown by the arrow 61 thereby momentarily separating or decreasing the frictional contact between the upper step 43 of the idler wheel 41, and the turntable flange 50'. The idler wheel is moved in an arc about its point of contact with the rotor shaft 52 away from said turntable flange and therefore, is more easily vertically shifted to its lowermost position due to a decrease in frictional contact with said turntable flange. The upper step 43 of said idler wheel will tend to move inwardly from the turntable flange 50' until the lugs 20 reach the upper lands 32. Excessive or unnecessary inward movement is prevented by the post extension 48 positioned within the supplemental plate aperture 11a. When the forces represented by the arrows 60 and 61 have been relieved, the spring 55 on the post extension 48 again biases the idler wheel 41 into resilient engagement with the turntable flange.

It is to be realized that the speeds selected are arbitrary and that any particular speed changes might be employed. It is further contemplated that more than two speed changes might be provided by providing additional steps on the rotor shaft and additional lands and camming surfaces.

Although we have described our invention with a preferred embodiment thereof as we have indicated in our specification, we do not wish to be restricted to the exact form or to dimensions and slight changes, since we contemplate that various changes may be made therefrom without, however, departing from the spirit of our invention and the scope of the appended claims.

We claim:

1. A plural-speed, phonograph turntable driving mechanism adapted to drive a turntable having a circumferentially dependent flange, said mechanism mounted upon a plate and comprising a stepped, motor driven rotor shaft having peripheral driving portions of different diameters, an idler wheel interposed between said rotor shaft and said turntable flange, pivotal mounting means for said idler wheel vertically movably mounted upon said plate, said pivotal mounting means comprising a first portion and a second portion in coaxial relationship, said portions adapted for pivotal movement whereby said first portion moves axially relative to said second portion in response to the pivoting of said second portion, and said idler wheel mounted to move with said first portion whereby it contacts said rotor shaft at different of said peripheral driving portions to drive said turntable at different selected speeds.

2. A plural-speed, phonograph turntable driving mechanism adapted to drive a turntable having a circumferentially dependent flange, said mechanism mounted upon a plate and comprising a stepped, motor driven rotor shaft having peripheral driving portions of different diameters, an idler wheel interposed between said rotor shaft and said turntable flange, a vertical shaft secured to said plate, pivotal mounting means for said idler wheel vertically movably mounted upon said vertical shaft, said mounting means having circumferentially disposed camming surfaces, cam follower means mounted coaxially with said pivoted mounting means upon said shaft and adapted upon rotation thereof to vertically cam said mounting means to vertically different levels whereby said idler wheel contacts different of said peripheral driving portions of said rotor shaft while maintaining driving engagement with said turntable flange to drive the same at different selected speeds.

3. A phonograph turntable driving mechanism for driving a turntable having an annular depending flange, said mechanism mounted upon support means and comprising a stepped rotor shaft having peripheral driving portions of different diameters, an idler wheel interposed between said rotor shaft and said flange, an articulated mount pivotally and vertically movably mounted upon said support means at one end of said mount, said idler wheel mounted upon the opposite end of said mount, cam follower means mounted coaxially with said mount upon said support means, said mount having cam means mounted coaxially with said mount adapted to coact with said cam follower means whereby when said cam follower means is rotated said mount is moved vertically, a reciprocating arm slidably mounted upon said support means and having one end attached to said cam follower means whereby when said arm is reciprocated, said cam follower means is rotated and said mount and associated idler wheel are moved to vertically different levels to contact said different peripheral driving portions of said rotor to drive the turntable at different selected speeds.

4. A phonograph turntable driving mechanism for driving a turntable having an annular depending flange, said mechanism mounted upon support means and comprising a stepped rotor shaft having peripheral driving portions of different diameters disposed at different levels, an idler wheel having a lowermost relatively large pulley portion and an uppermost relatively smaller pulley portion, said idler wheel interposed between said rotor shaft and said turntable flange whereby said larger pulley portion contacts said rotor shaft and said smaller pulley portion contacts said turntable flange, a vertical shaft secured to said support means, a hub slidably telescoped upon said shaft, said hub having vertically facing cam surfaces, a cam follower element rotatably mounted upon said shaft and adapted upon rotation thereof to cam said hub axially downwardly on said shaft, a coil spring telescoped over said shaft and interposed between said hub and said support means whereby said hub is biased in an upward direction against said follower element, a reciprocating control arm pivotally eccentrically mounted to said follower means whereby said follower means is partially rotated to cam said hub downwardly, said hub having a horizontally disposed arm, a mounting plate pivoted to said arm, said idler wheel mounted upon said mounting plate to move with said hub whereby said idler wheel is disposed at different levels to contact different driving portions of said rotor thereby driving said turntable at different speeds.

5. A phonograph turntable driving mechanism for driving a turntable having an annular depending flange, said mechanism mounted upon a support means and comprising a stepped rotor shaft having two peripheral driving positions of different diameters disposed at different levels, an idler wheel having a lowermost relatively large pulley portion and an uppermost relatively smaller pulley portion, said idler wheel interposed between said rotor shaft and said turntable flange whereby said larger pulley portion contacts said rotor shaft and said smaller pulley portion contacts said turntable flange, a vertical shaft secured to said support means, a cylindrical hub slidably mounted concentrically upon said shaft, said hub having a pair of circumferential upwardly facing cams, a cam follower element mounted rotatably upon said shaft having a pair of cam followers adapted to coact with said cams to move said hub axially upon said shaft by rotation of said cam follower element, a coil spring telescoped over said shaft and interposed between said hub and said support means whereby said hub is biased in an upward direction against said follower element, means for partially rotating said follower element in either direction, said hub having a horizontally disposed arm, a mounting plate pivoted to said arm for movement in a horizontal plane, said idler wheel mounted upon said mounting plate to move with said hub whereby said idler wheel is disposed at different levels to contact different driving portions of said rotor thereby driving said turntable at different speeds, the recited parts so arranged that when the follower element is rotated to move said idler wheel downwardly, said hub is slightly rotated therewith and said idler wheel is caused to momentarily move away from said turntable flange.

6. A phonograph turntable driving mechanism for driving a turntable having an annular depending flange, said mechanism mounted upon support means and comprising a stepped rotor shaft having two peripheral driving portions of different diameters disposed at different levels, an idler wheel having a lowermost relative large pulley portion and an uppermost relatively smaller pulley portion, said idler wheel interposed between said rotor shaft and said turntable flange whereby said larger pulley portion contacts said rotor shaft and said smaller pulley portion contacts said turntable flange, said idler wheel vertically movable to two adjusted positions whereby it contacts said peripheral driving portions of said rotor to drive said turntable at different speeds, means for vertically shifting said idler wheel comprising a vertical shaft secured to said support means, a cylindrical hub slidably mounted concentrically upon said shaft, said hub having a pair of circumferential upwardly facing cams, a cam follower element mounted rotatably upon said shaft having a pair of downwardly struck cam followers adapted to coact with said cams to move said hub axially upon said shaft by rotation of said cam follower element, a coil spring telescoped over said shaft and interposed between said hub and said support means whereby said hub is biased in an upward direction against said follower element, said hub having a horizontally disposed arm, a mounting plate pivoted to said arm for movement in a horizontal plane and disposed substantially at right angles to said arm, said idler wheel mounted upon said mounting plate, said arm, mounting plate, and idler wheel movable unitarily with said hub, a control arm pivoted eccentrically upon said follower element and adapted for reciprocating movement to partially rotate said follower element to vertically move said hub and idler wheel to said adjusted positions, the recited parts so arranged that when the follower element is rotated to move said idler wheel downwardly, said hub is slightly rotated therewith and said idler wheel is caused to momentarily move away from said turntable flange.

References Cited in the file of this patent

UNITED STATES PATENTS

| | | |
|---|---|---|
| 2,228,931 | Rysick | Jan. 14, 1941 |
| 2,756,603 | Tsien | July 31, 1956 |
| 2,786,559 | Sherwood | Mar. 26, 1957 |
| 2,788,669 | Richards | Apr. 16, 1957 |
| 2,826,926 | Singer | Mar. 18, 1958 |

FOREIGN PATENTS

| | | |
|---|---|---|
| 463,430 | Canada | Feb. 28, 1950 |